US005112151A

United States Patent [19]

Collignon

[11] Patent Number: 5,112,151

[45] Date of Patent: May 12, 1992

[54] COVER FOR ARTIST'S PASTEL

[75] Inventor: Theresa Collignon, Sydney, Australia

[73] Assignee: Ofrex Group Holdings, PLC, West Dryaton, Middlesex, United Kingdom

[21] Appl. No.: 478,601

[22] Filed: Feb. 12, 1990

[30] Foreign Application Priority Data

Feb. 10, 1989 [GB] United Kingdom ................ 8903052

[51] Int. Cl.[5] ...................... B43K 19/14; B32B 27/10

[52] U.S. Cl. ........................................ 401/96; 401/97; 428/910; 428/511

[58] Field of Search ...................... 401/96, 97, 91, 88; 428/910, 511

[56] References Cited

U.S. PATENT DOCUMENTS

| | | | |
|---|---|---|---|
| 620,051 | 2/1899 | Rakestraw | 401/97 |
| 2,720,966 | 10/1955 | Davis | 401/97 X |
| 3,981,412 | 9/1976 | Asmus | 220/270 |
| 4,019,822 | 4/1977 | Matsumoto et al. | 401/96 |
| 4,086,388 | 4/1978 | Brown | 428/910 X |
| 4,430,013 | 2/1984 | Kanfman | 401/132 |
| 4,848,378 | 7/1989 | Moir et al. | 132/319 |
| 5,021,272 | 6/1991 | Mohri et al. | 428/192 X |
| 5,023,138 | 6/1991 | McIntyre | 428/511 X |

FOREIGN PATENT DOCUMENTS

| | | |
|---|---|---|
| 340818 | 1/1931 | United Kingdom . |
| 752533 | 7/1956 | United Kingdom . |

*Primary Examiner*—Danton D. DeMille

*Attorney, Agent, or Firm*—Skjerven, Morrill, MacPherson, Franklin & Friel

[57] ABSTRACT

An artist's crayon or chalk is provided with a cover which is made of a sheet of axially oriented polymer, the sheet having one side provided by a plurality of arcuate regions separated by cusps, the regions forming tear tabs. By gripping a tear tab and tearing, the axially oriented polymer will tear in a substantially straight line thus enabling the required amount of cover to be removed from the pastel. The cover may initially be provided in a self-adhesive form adhered to a peel-off backing sheet.

8 Claims, 1 Drawing Sheet

COVER FOR ARTIST'S PASTEL

BACKGROUND OF THE INVENTION

1. Field of Invention

This invention relates to a structure and method for covering an artist's pastel and also to a method for manufacturing a cover for an artist's pastel.

2. Description of the Related Art

In this Specification the word "pastel" is used in a relatively broad sense and includes, within its scope, an artist's chalk and similar drawing means. An artist's pastel comprises a cylindrical rod or stick of pastel material. The pastel material is a compressed powder, and is thus readily friable. Traditionally such sticks of pastel material have been provided with a cover formed from paper or a paper-based material. In order to form the cover, a sheet of paper or paper-based material is wrapped around and adhered to the exterior of the stick of pastel, so as to extend over substantially the entire length of the stick leaving, however, one end portion of the stick exposed for use. Conventionally the paper or paper-like material has comprised a paper having certain grease-proof properties.

As the artist begins to use the pastel, the pastel material at the exposed end of the stick is worn away. It is then necessary for the artist to tear away part of the paper or paper-like material surrounding the rest of the stick. It is often difficult to achieve a tidy tear because of the poor tearing characteristics of the paper which is utilized to form the cover for the stick. Also, with extended use, the cover paper absorbs grease from the hands of the artist. Then dust which is generated as the pastel is applied tends to adhere to the cover paper. Consequently the artist, in utilizing pastels, tends to get dirty hands, because the pastel dust which has accumulated on the greased cover paper now clings to his fingers. This is clearly undesirable.

Chalk is widely used by artists and also by teachers. Chalk is commonly used in the form of rods or sticks, which usually do not have a cover. Chalk dust from such bare sticks of chalk tends to adhere to the fingers of the person using the chalk.

OBJECT OF THE INVENTION

The present invention seeks to provide an improved artist's pastel or chalk and an improved covering for an artist's pastel or chalk.

SUMMARY OF THE INVENTION

According to one aspect of this invention, there is provided a cover for an artist's pastel or for chalk, said cover comprising a sheet of material, said sheet of material comprising a layer of an axially orientated polymer.

According to another aspect of this invention, there is provided a pastel or chalk comprising a substantially cylindrical stick, said stick having applied thereto a cover, said cover comprising a sheet of material, said sheet of material comprising a layer of an axially oriented polymer.

Preferably said sheet of material is laminated to a sheet of backing material.

Conveniently said backing laminate comprises a sheet of glassine paper.

Advantageously said polymer material comprises axially oriented polythene.

Conveniently wherein the cover is of substantially square or rectangular form, it is provided with one side formed by a plurality of regions separated from one another by cusps, the said regions forming tear-tabs.

According to another aspect of this invention, there is provided a cover for a pastel or for a chalk, said cover comprising a sheet of material, said sheet being substantially square or rectangular, one side of the sheet being provided with a plurality of regions separated by cusps, the said regions being adapted to form tear-tabs.

Preferably each of said regions has an arcutate edge.

Conveniently the cover includes an adhesive layer to make it self-adhesive.

According to a further aspect of this invention there is provided a pastel or chalk comprising a substantially cylindrical stick, said stick having adhered thereto a cover, said cover comprising a sheet of material, said sheet being substantially square or rectangular, one side of the sheet being provided with a plurality of regions separated by cusps, the said regions being adapted to form tear-tabs.

Other features of the invention will become apparent from the below, more detailed, description.

INTRODUCTION TO THE DRAWINGS

The invention will now be described with reference to the accompanying drawings in which FIG. 1 is a perspective view of a cover for an artist's pastel, and FIG. 2 is a perspective view of an artist's pastel provided with the covering shown in FIG. 1.

DESCRIPTION OF PREFERRED EMBODIMENT

The following description includes the best modes contemplated by the inventor for carrying out the invention. The description is merely exemplary of the invention and is not to be taken in a limiting sense.

Figure 1:
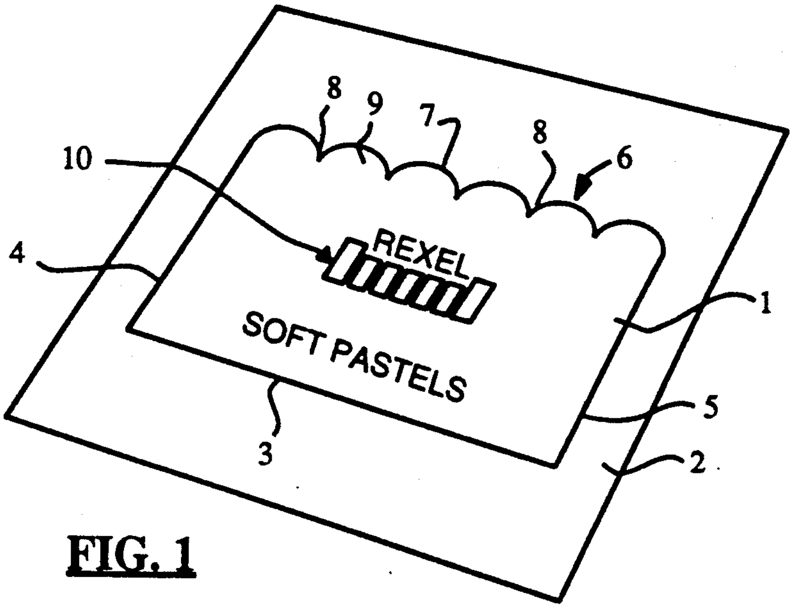
Figure 2:
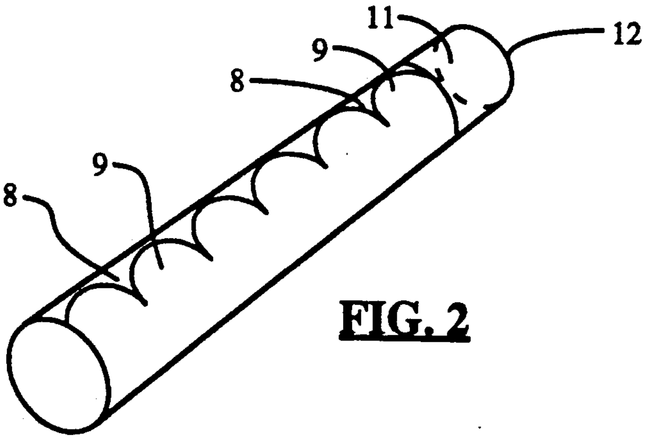

Referring initially to FIG. 1, a cover for a pastel comprises a self-adhesive sheet 1 of a material having specific properties. The sheet of material 1 may initially be provided adhered to a siliconized backing sheet 2.

The cover sheet 1 is of a generally rectangular form, having three linear sides 3, 4, and 5. The fourth side 6 of the cover sheet 1 is preferably not linear, but rather has a plurality of regular arcuate portions 7, which are virtually semi-circular. A cusp or indentation 8 into the side of the sheet is formed between each adjacent pair of arcuate portions 7, 7. As will become apparent, each arcuate portion 7 defines a tear-tab 9.

The sheet 1 is formed of a laminated material. One layer of the laminate comprises an axially oriented polythene material. This is a polymer material which has been treated to provide axially oriented molecules. It has been found that such a material has a desirable linear tear characteristic. In other words, when the material is torn, the material tends to tear with a substantially linear tear line. This is in contrast to an amorphous paper material which may tear with a jagged tear line.

The polymer material also has the desirable characteristic that the material will not absorb grease.

In the laminate constituting the sheet 1 the polymer material layer is adhered onto a glassine substrate.

The upper polymer material layer may be preferably subjected to a corona discharge treatment in order to improve the surface tension of the material; and to make the surface scratch resistant.

The preferred material for use is that sold under the designation OPTICITE (OPTICITE is a British Trade Mark). This material is marketed by Fasson Limited of Great Britain.

The upper surface of the cover sheet 1 may be provided with printing 10 thereon indicating the manufacturer of the pastel, the quality of the pastel, and the specific color of the pastel.

The cover 1 has self-adhesive properties and may thus be readily applied to a cylindrical rod or stick 11 comprising a pastel. Initially the linear side 3 of the sheet 1, which is opposed to the side 6 formed by the arcuate portions 7, is applied to the pastel in line with the longitudinal axis of the stick, and the cover is then effectively wrapped around the pastel, so that the side 6 comprising the arcuate portions of tear-tabs 9 is wrapped about the pastel last. Preferably these tabs 9 are not adhered directly to the material comprising the rod or stick of pastel, but instead are wrapped over the upper surface of the portion of the sheet 1 that was first applied to the rod or stick of pastel material. One end 12 of the rod of pastel material is left exposed and thus ready for use.

When an artist has used the pastel, so that the exposed end portion 12 has been worn away, the artist may peel away, from the underlying portion of the cover 1, the tear-off tab 9, which is closest to the exposed end 12 of the stick 11 of pastel material. He may then grasp that tear-off tab between thumb and forefinger and apply a tearing force. A tear will then commence at the base of the cusp 8 between the grasped tab 9 and the next adjacent tab. Because of the linear tearing characteristics of the cover, that tear will tend to bend, automatically, to extend circumferentially around the pastel. Thus a strip of cover of a substantially uniform and predetermined width is torn smoothly and easily from the rest of the cover, thus exposing a predetermined length of the rod or stick of pastel material.

Since the cover 1 is made of a material which does not absorb grease, pastel dust does not tend to cling to the cover. Thus it is possible for the artist to maintain clean hands while applying pastel to an appropriate medium.

The described cover may equally be applied to a stick of chalk.

While the invention has been described by way of example with reference to a specific embodiment it is to be understood that many modifications may be effected without departing from the scope and spirit of the invention.

What is claimed is:

1. A marking implement comprising:

a stick of a marking material, said stick having a longitudinal external surface with respect to a central axis of said stick; and self-adhesive covering means for covering said longitudinal external surface, said covering means comprising a polymer layer of an axially oriented polymer and a substrate layer of glassine paper, said polymer layer being laminated to said substrate layer, said covering means being axially wrapped around said longitudinal external surface with respect to said central axis so that a first edge of the covering means is disposed substantially parallel to said central axis and so that said first edge is overlaid by a portion of said covering means, a second edge of the covering means having a plurality of regions separated by cusps, each of said regions forming a tear-tab.

2. The marking implement of claim 1, wherein said marking material is a pastel material.

3. The marking implement of claim 1, wherein said marking material is chalk.

4. A cover for a pastel or chalk writing implement, said cover comprising a sheet of material, said sheet of material comprising an axially oriented polymer which is laminated to a substrate, the cover being self-adhesive and being adhered to a peel-off base sheet, the cover being of substantially square or rectangular form having one side formed by a plurality of regions separated by cusps, said regions forming tear tabs.

5. The cover of claim 4, wherein said substrate comprises a sheet of glassine paper.

6. The cover of claim 4, wherein said axially oriented polymer comprises axially oriented polythene.

7. The cover of claim 4, wherein said peel-off base sheet comprises a sheet of siliconized paper.

8. The cover of claim 4, wherein each of said regions has an arcuate edge.

* * * * *